(12) United States Patent
Brady et al.

(10) Patent No.: US 11,148,289 B1
(45) Date of Patent: Oct. 19, 2021

(54) ENTANGLEMENT END EFFECTOR FOR AUTONOMOUS OBJECT RETRIEVAL

(71) Applicant: Amazon Technologies, Inc., Seattle, WA (US)

(72) Inventors: Tye Brady, Southborough, MA (US); Anthony Catacchio, Nashua, NH (US); Brendan Patrick Collins, Manchester, NH (US); Gregory Longtine, Sudbury, MA (US); Jon Taylor, Groton, MA (US); Taylor Tobin, Nashua, NH (US)

(73) Assignee: Amazon Technologies, Inc., Seattle, WA (US)

( * ) Notice: Subject to any disclaimer, the term of this patent is extended or adjusted under 35 U.S.C. 154(b) by 361 days.

(21) Appl. No.: 16/242,523

(22) Filed: Jan. 8, 2019

(51) Int. Cl.
  *B25J 9/16* (2006.01)
  *B25J 9/00* (2006.01)
  *G06K 7/14* (2006.01)

(52) U.S. Cl.
  CPC ........... *B25J 9/1664* (2013.01); *B25J 9/0018* (2013.01); *B25J 9/162* (2013.01); *B25J 9/1653* (2013.01); *B25J 9/1669* (2013.01); *B25J 9/1697* (2013.01); *G06K 7/1417* (2013.01)

(58) Field of Classification Search
  CPC .................................... B25J 9/16; B25J 9/00
  See application file for complete search history.

(56) References Cited

U.S. PATENT DOCUMENTS

| | | | |
|---|---|---|---|
| 5,446,835 A | 8/1995 | Iida et al. | |
| 6,193,291 B1 | 2/2001 | Morroney | |
| 8,606,398 B2 | 12/2013 | Eakins et al. | |
| 9,486,921 B1 | 11/2016 | Straszheim et al. | |
| 10,012,664 B2 | 7/2018 | Wasson et al. | |
| 10,360,531 B1* | 7/2019 | Stallman | G06K 7/1413 |
| 10,583,560 B1 | 3/2020 | Rodrigues et al. | |
| 10,751,882 B1 | 8/2020 | Brady et al. | |
| 2003/0035711 A1 | 2/2003 | Gilchrist | |
| 2008/0009972 A1 | 1/2008 | Nihe et al. | |
| 2011/0245846 A1* | 10/2011 | Ewers | A61B 17/04 606/139 |
| 2012/0259462 A1 | 10/2012 | Aoba | |
| 2012/0277911 A1* | 11/2012 | Jacobsen | B25J 5/007 700/258 |
| 2013/0130369 A1 | 5/2013 | Wilson et al. | |
| 2013/0211593 A1 | 8/2013 | Domae et al. | |
| 2014/0018892 A1* | 1/2014 | Dahlberg | A61N 1/057 607/116 |
| 2014/0037413 A1 | 2/2014 | Takashima et al. | |
| 2014/0073043 A1 | 3/2014 | Holmes | |

(Continued)

OTHER PUBLICATIONS

Olson, Edwin. AprilTag: A robust and flexible visual fiducial system. Proceedings of the IEEE International Conference on Robotics and Automation (ICRA), May 2011.

*Primary Examiner* — Kira Nguyen
(74) *Attorney, Agent, or Firm* — Knobbe Martens Olson & Bear, LLP

(57) ABSTRACT

Features are disclosed for an end effector for automated identification and handling of an object. The end effector includes an entangling structure that can be positioned over an entanglement point of an overpackage in which a desired object is location using sensors. Using the location information, the end effector can identify a path to the entanglement location and detect whether the overpackage is engaged by detecting environmental changes at the end effector.

20 Claims, 8 Drawing Sheets

(56) References Cited

U.S. PATENT DOCUMENTS

| | | |
|---|---|---|
| 2014/0234949 A1 | 8/2014 | Wasson et al. |
| 2015/0101635 A1* | 4/2015 | Shnol ........................ B25J 1/04 134/6 |
| 2017/0062263 A1 | 3/2017 | Kesil et al. |
| 2018/0068139 A1 | 3/2018 | Aalund et al. |
| 2018/0117767 A1 | 5/2018 | Yokota et al. |
| 2018/0162642 A1 | 6/2018 | Schneider et al. |
| 2019/0070734 A1* | 3/2019 | Wertenberger ........ B25J 9/1697 |
| 2020/0184542 A1 | 6/2020 | Welty et al. |
| 2020/0331142 A1* | 10/2020 | Vangal Ramamurthy ................... B25J 9/0009 |
| 2021/0023696 A1* | 1/2021 | Wagner .............. G05B 19/4182 |

\* cited by examiner

ENTANGLEMENT END EFFECTOR FOR AUTONOMOUS OBJECT RETRIEVAL

BACKGROUND

Robotic solutions capable of identifying and manipulating high volumes of objects may be included to automate fulfillment processes, such as picking an object from a receptacle, stowing an object within a receptacle, decanting an object, and packing an object for transfer to a new location (e.g., shipping to a recipient).

One barrier to achieving such a robotic solution is the enormous variation in the various objects that may be processed by the system. It is tremendously difficult for robots and automated solutions to physically manipulate each object, due in part to different shapes of the objects, different packaging material for the objects, different weights of the objects, or other physical characteristics that create uncertainty in identifying and grasping an object. The accuracy represents part of this barrier. Another aspect is speed. To provide advantages over existing object processing, manipulation of an object would need to be performed as fast, if not faster, than the existing processes.

BRIEF DESCRIPTION OF THE DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
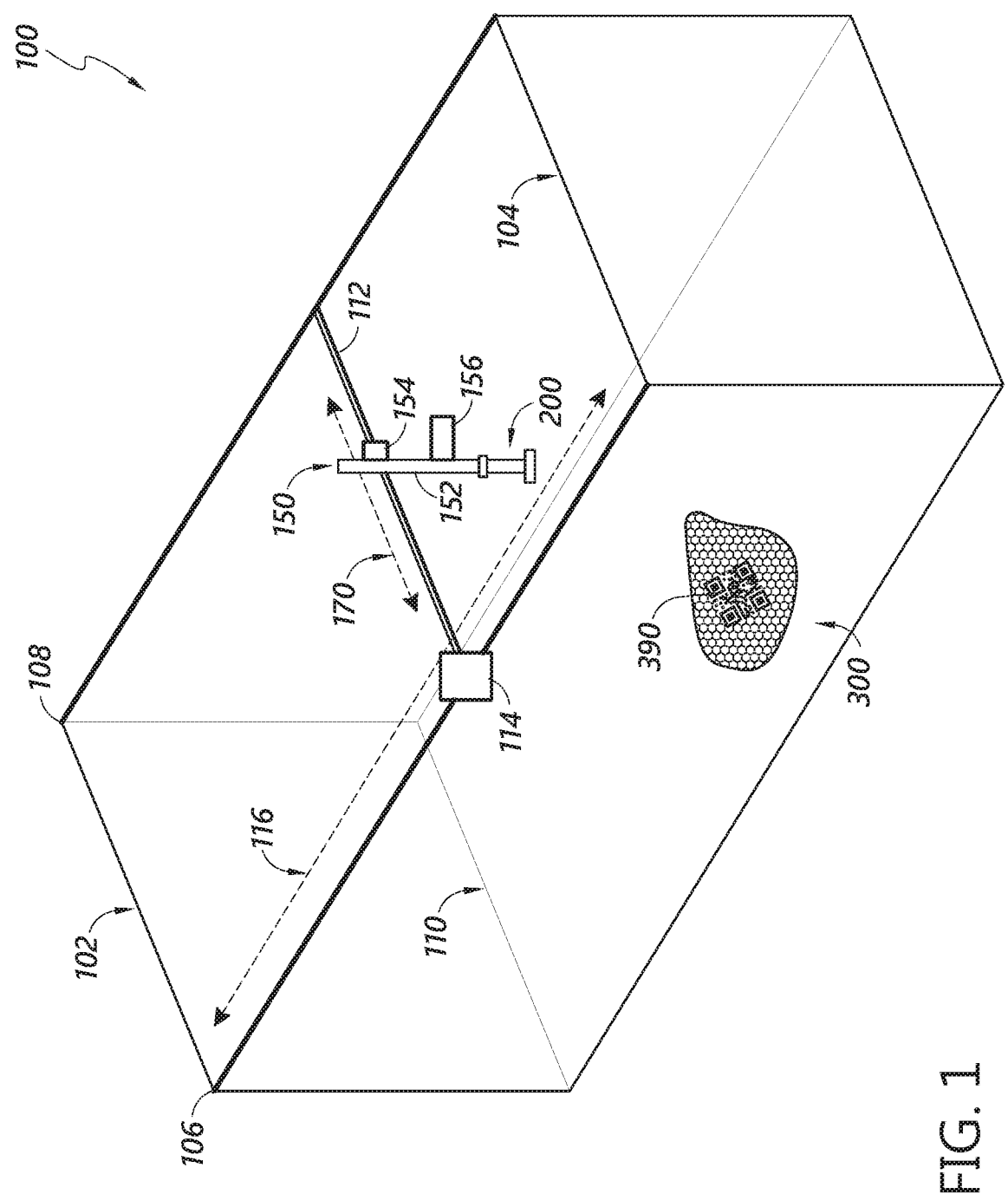
FIG. 1 is a block diagram showing an example robotic retrieval system capable of retrieving an overpackage from stowage using an entanglement end effector.

Within a fulfillment center, objects may be received for storage until such time as they are requested for delivery to a recipient or another fulfillment center. Objects of many different shapes and sizes may be processed through the fulfillment center. Objects may be processed by a robotic retrieval system. The robotic retrieval system may include autonomous actors such as robots or mobile drive units that may be deployed within the fulfillment center to facilitate the processing of objects. The ability of any given autonomous actor to manipulate an object may be limited to its ability to identify the object as well as a manner of grasping the object in a way that does not damage the object.

The present disclosure is generally related to an entanglement end effector that may locate and engage an overpackage that forms a handling unit for one or more objects in a fulfillment center. As described herein, the overpackage may include a mesh surrounding an envelope that forms an inner recess to contain one or more objects. The overpackage may include one or more detectable identifiers affixed to the mesh or the envelope. Using the detectable identifiers, an entanglement end effector of a robot or other autonomous actor may locate the overpackage in which an object of interest is stored. An end effector generally refers to a mechanism that can be positioned within a fulfillment center and activated to couple with the overpackage (and any object included therein) to move the overpackage to a destination location, such as a loading bay in the fulfillment center. As an example, the entanglement end effector may include an entanglement structure such as a coil or thread of rigid or semi-rigid material (e.g., metallic wire, polymer such as polycarbonate, or composites thereof). The detectable identifiers may also provide guidance to position the entanglement end effector near a zone of the mesh. Once near the zone, the entanglement end effector may activate the entanglement structure to entangle with the mesh. The entanglement forms a coupling that allows the entanglement end effector to lift and move the overpackage to another location within the fulfillment system. The identifiers on the overpackage assist a robot or other automated actor in a fulfillment center to identify an object, orient the robot vis-à-vis the object (this may be referred to as "localizing to the object"), and grasp the object in a reliable and safe manner.

The overpackage may include features to increase discovery and manipulation of an object in addition to enveloping the object during processing. One such feature provides unique identification of a specific instance of an object enclosed in the overpackage. Using board games as an example, a specific instance of a board game would be a specific box containing a copy of the board game. An identifier for the board game may be associated with a unique identifier for an overpackage into which the board game will be placed. Once enclosed in or otherwise coupled with the overpackage, this specific instance of the board game may be uniquely identified using an identifier placed at a particular geometry on the overpackage. The identifier may indicate data associated with the overpackage such as its unique identifier. For example, an AprilTag may be included for basic data about the overpackage that can be easily detected using an image of the overpackage taken from a distance. A quick response (QR) code may be included to encode more extensive data about the overpackage and to provide more detailed localization information indicating where on the overpackage the code is located. A passive radiofrequency identification (RFID) tag or other passive wireless circuit may be included for identification of the overpackage through wireless signaling when line of sight, such as for optical scanning of QR codes or AprilTags, to the overpackage is occluded. Example features of AprilTags are described by Edwin Olson in "AprilTag: A Robust and Flexible Visual Fiducial System" Proceedings of the IEEE International Conference on Robotics and Automation (ICRA) (May 2011) which is incorporated by reference in its entirety.

The features also provide information about how and where a robot or other autonomous actor should entangle with the overpackage. The grasping information can be embedded into identifiers on the overpackage. For example, QR codes, when viewed through a camera or other imaging system, can produce a three-dimensional (3D) localization vector. The 3D localization vector may provide location information to orient the camera system to the overpackage. The camera system may include a sensor associated with an entanglement end effector of the autonomous actor that will retrieve the overpackage. Because the 3D localization vector orients the entanglement end effector to the overpackage, the entanglement end effector may be accurately and quickly moved to entangle with a specific portion of the overpackage such as a specific zone of the mesh or other pick point. In some implementations, the entanglement end effector may include multiple entanglement structures. For example, different materials may be used to form the coil which can impact the load that may be lifted by the entanglement structure. An identifier on the overpackage may include information for selecting an entanglement structure for a specified overpackage.

An overpackage may include redundant identifiers. Having redundant solutions allows for less defects per million objects (DPMO), more flexibility and real-time adjustments to different environments that the overpackage will encounter (e.g., unstructured storage, manipulation while moving, alternative storage options).

In one embodiment utilizing overpackages, a specific instance of an object may be placed inside an overpackage by a human or automated machine, assuring the right size overpackage has been selected based on physical characteristics of the object such as dimensions of the object or weight of the object. Once the object is enclosed within the overpackage, a record may be created associating the identifier for the object with the identifier for the overpackage. The attributes associated with the object (e.g., size, weight, object classifier, etc.) may be correlated (e.g., hand scanning of codes, optical scanning of codes, manual typing of code) with a unique overpackage identification number. The unique overpackage identification number may be encoded within visible QR codes associated with the overpackage. The overpackage structure and indicators thereon enables the overpackage to be both self-identifying and more easily graspable by autonomous systems.

Multiple different overpackages may be packed into a container (e.g., a tote, a bin, a pallet, a crate, etc.) and moved into a robotic retrieval system where robotic arms and gantry like systems could automatically pick, sort, and move the enclosed objects from the container. Identification of an object may be achieved by reading the identifiers on the overpackage. The overpackage unique identifier can be used to identify the object identifier.

In some implementations, the identifier on the overpackage, such as a QR code, may provide a known optical pattern with known spacing that provides the robotic system with a highly accurate 3D vector from the sensing optical camera to the specific overpackage QR code. This allows for the associated robotic end effector to determine exactly where the overpackage is in order to manipulate the overpackage and thus the object enclosed within.

In some implementations, it may be desirable for overpackage to be at least partially formed of a transparent material or include a transparent portion to allow inspection of the enclosed object.

The robotic retrieval system may detect an identifier on the overpackage to obtain relative directions from the self-identifying identifier to the location of an entanglement zone of the overpackage. Using the directions, the robotic retrieval system may maneuver an entanglement end effector near the entanglement zone.

Once near the entanglement zone, the entanglement structure may extend away from the end effector toward the overpackage. As the entanglement structure extends, it may also rotate to engage with one or more openings of the mesh. After completing a number of rotations of the entanglement structure, the entanglement end effector may attempt to raise the entanglement structure and thereby lift the overpackage. The raising may include performing an initial lift to detect whether the entanglement structure is engaged with the overpackage. The detection may be based on a load detector included in the entanglement end effector. If, upon lifting, the load on the entanglement structure is less than an expected amount, the entanglement structure may be rotated in an opposite direction as rotated during extension. The entanglement structure may also be retracted to allow the end effector to reposition for another entanglement attempt.

Once the overpackage is in the grasp of the entanglement end effector, the robotic retrieval system may move the overpackage to a destination location for further processing. The processing may include confirming the appropriate overpackage is being moved such as by comparing an identifier on the overpackage with an identifier of the intended item or comparing a characteristic of the overpackage (e.g., size or weight) with expected characteristic of the object contained in the overpackage. The processing may include picking objects for an order, stowing objects in a location, or sorting objects being added to the fulfillment center. In some cases, these processes may be performed without human touch.

FIG. 1 is a block diagram showing an example robotic retrieval system capable of retrieving an overpackage using an end effector. The robotic retrieval system 100 in FIG. 1 shows a gantry which includes a first support 102 and a second support 104 connected by a first lateral rail 106 and a second lateral rail 108. The gantry also includes a cross-rail 112 which is perpendicular to the first lateral rail 106 and the second lateral rail 108. The cross-rail 112 is coupled to the first lateral rail 106 and the second lateral rail 108 such that the cross-rail 112 can traverse an area 110 under the gantry to, for example, retrieve an object enclosed in an overpackage 300. The overpackage 300 may be self-identifying by including one or more indicators on its surface which can encode or otherwise convey information about the indicator (e.g., size, location on the overpackage 300) as well as the overpackage 300 (e.g., a unique identifier for the overpackage 300). The overpackage 300 shown in FIG. 1 includes a scannable identifier 390.

The cross-rail 112 may traverse the area 110 using a rail motor 114. The rail motor 114 may be driven to cause the cross-rail 112 to move along the first lateral rail 106 and the second lateral rail 108. In some implementations, the cross-rail 112 may be driven using belts, electromagnetism, or other driver. FIG. 1 shows the rail motor 114 coupled with the first lateral rail 106. In some implementations, the rail motor 114 may be coupled with the second lateral rail 108. In some implementations, the cross-rail 112 may be driven by a driver on both the first lateral rail 106 and the second lateral rail 108.

The rail motor 114 may be driven through command messages transmitted to the rail motor 114 from a controlling device. The command messages may form control signals that can be interpreted by the rail motor 114 or a controlling device. In some implementations, the controlling device may be a grasping mount 150.

The grasping mount 150 may be coupled with the cross-rail 112. The grasping mount 150 is moveably coupled with the cross-rail 112 to allow an entanglement end effector 200 to traverse the area 110 under the gantry. The grasping mount 150 may be driven along the cross-rail 112 using a motor 154. In some implementations, the grasping mount 150 may be driven using belts, electromagnetism, or other driver. The motor 154 may be driven through command messages transmitted to the motor 154 from a controlling device. In some implementations, the controlling device may be included in the grasping mount 150.

By driving one or both of the rail motor 114 and the motor 154, the entanglement end effector 200 may be positioned over a location in the area 110 such as to retrieve the overpackage 300. To determine the location of the entanglement end effector 200 and the location of the overpackage 300, the grasping mount 150 may include a sensor 156. The sensor 156 may be an optical sensor (e.g., camera), acoustic sensor, or wireless signal sensor. The sensor 156 may be mounted on a shaft 152 of grasping mount 150. It may be desirable to position the sensor 156 at a known distance from the ground. In this way, a sensing model can be constructed to provide proximate location of the sensor 156 in relation to the detected information.

The shaft 152 may house electronics such as a processor to control the sensor 156 and receive data detected by the sensor 156, a wireless or wired transceiver to communicate detected data or control messages, and a power source to provide power to the grasping mount 150. The shaft 152 may include an elevation mechanism to raise or lower the entanglement end effector 200. Examples of the elevation mechanism include a winch or a pulley which may be adjusted to control the height of the entanglement end effector 200 from the area 110 under the gantry.

The entanglement end effector 200 may be lowered or raised to interact with the overpackage 300. The entanglement end effector 200 may be lowered or raised using the winding mechanism. The entanglement end effector 200 may include components that can be activated to detect or couple with the overpackage 300. For example, an entanglement structure may be included in the entanglement end effector 200. The entanglement structure may extend to entangle and retract to disentangle with a portion of the overpackage 300. The entanglement structure may rotate to in a first direction as it extends and rotate in a second direction opposite to the first direction as it retracts.

The entanglement end effector 200 may communicate with the processor included in the shaft 152 or other controlling device. In some implementations, the entanglement end effector 200 may include a wireless communication device such as a BLUETOOTH™ transceiver to communicate with the controlling device. Between the elevation mechanism, the rail motor 114, and the motor 154, the entanglement end effector 200 may be moved in three dimensions within the area 110.

As the sensor 156 and the end effector 200 approach the overpackage 300, the grasping mount 150 and/or the entanglement end effector 200 may be adjusted to position the entanglement end effector 200 at a pick point of the overpackage 300. The pick point may be a zone of mesh that can be entangled by the entanglement structure.

As shown in the robotic retrieval system 100 of FIG. 1, the entanglement end effector 200 moves through the area 110 via a gantry. In some implementations, the entanglement end effector 200 may be mounted to a robotic arm, mobile drive unit, or other autonomous actor with mechanisms to position the entanglement end effector 200 in a two or three dimensional space.

Figure 2A:
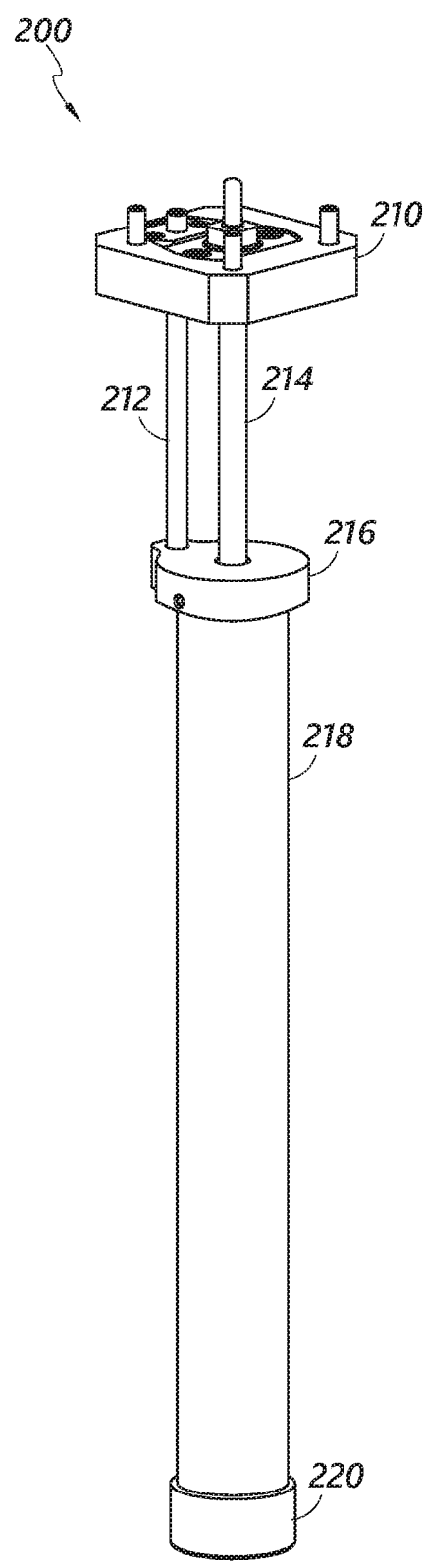
FIG. 2A is a diagram showing an illustrative entanglement end effector prior in a retracted state.

FIG. 2A is a diagram showing an illustrative entanglement end effector prior in a retracted state. The entanglement end effector 200 includes a mount 210 which can be used to couple the entanglement end effector 200 with the shaft 152. An anti-rotation guide 212 may be included to stabilize the entanglement end effector 200 during operation. Rotation of a rotation shaft 214 may raise a sheath 218 to expose an entanglement structure which is not visible in the retracted state shown in FIG. 2A.

The anti-rotation guide 212 may couple with a sheath mounting assembly 216. One end of the sheath 218 is coupled with the sheath mounting assembly 216. A second end of the sheath 218 opposing the end coupled with the sheath mounting assembly 216, may include a collar 220. The entanglement end effector 200 may include a rotation shaft 214. The rotation shaft 214 may extend through the sheath mounting assembly 216 to transfer a rotational force to the entanglement structure. A force may be applied to the rotation shaft 214 by a pneumatic actuator, motor, or other drive mechanism under control of a processor or other controlling device.

Figure 2B:
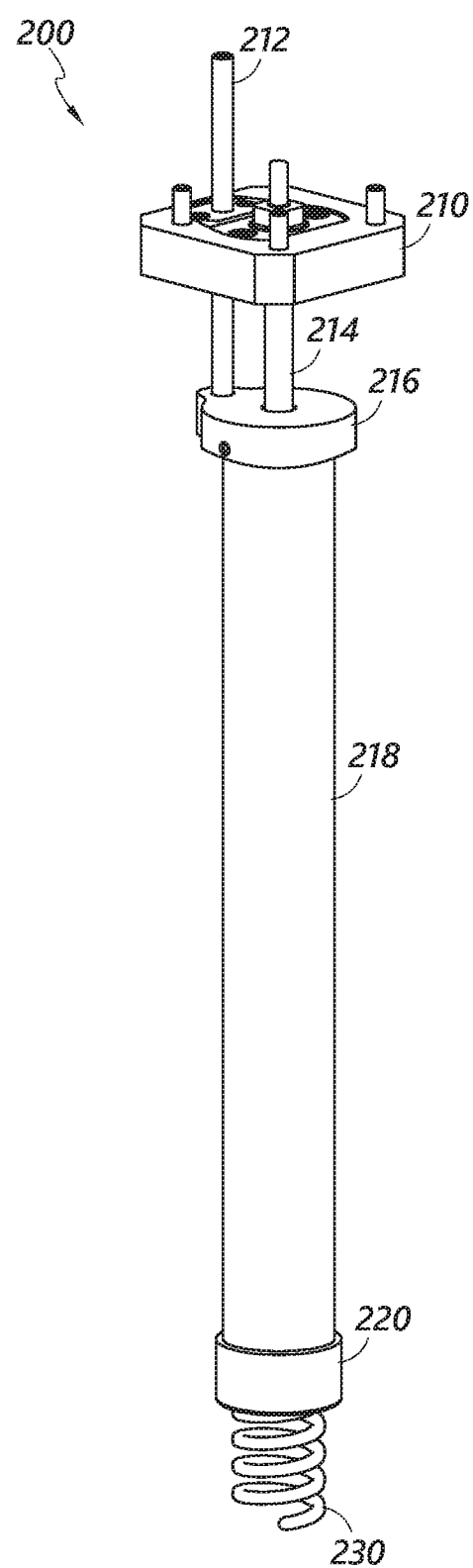
FIG. 2B is a diagram showing an illustrative entanglement end effector in an extended state.

FIG. 2B is a diagram showing an illustrative entanglement end effector in an extended state. In FIG. 2B, a portion the anti-rotation guide 212 is shown extending above the mount 210. The may be caused by rotation of the rotation shaft 214. As the rotation shaft 214 is activated, an entanglement structure 230 may rotate downward and cause an elevation of the sheath mounting assembly 216. As shown in FIG. 2B, the rotation shaft 214 may rotate the entanglement structure 230 in a clockwise direction to entangle by driving the distal tip of the entanglement structure 230 to thread a mesh onto and up the entanglement structure 230. Conversely, to disentangle the entanglement structure 230 shown in FIG. 2B, the rotation shaft 214 may rotate the entanglement structure 230 in a counter-clockwise direction. The collar 220 may also be lowered when retracting the entanglement structure 230 as the entanglement structure 230 rotates into the sheath 218. When lowered, the collar 220 may engage with the overpackage and create additional pressure to push the entangled mesh down the entanglement structure 230 to disengage the entanglement structure 230 from the overpackage. In some implementations, the leading tip of the entanglement structure 230 (e.g., the portion at the distal most portion of a coiled structure) may include a sensor. The leading tip may refer to a portion of the entanglement thread that entangles with an overpackage before another portion of the entanglement thread. The sensor may detect a force against the entanglement structure 230 such as when the entanglement structure 230 contacts the overpackage. This sensor may provide information to the processor controlling the force and/or speed of rotation for the entanglement structure 230. The entanglement end effector 200 may thus be controlled in a compliant fashion to initiate contact with an overpackage gently (e.g., by applying a low speed rotation or low rotational force) and then, once engagement is detected based on information from the sensor, the speed or force may be increased.

Figure 2C:
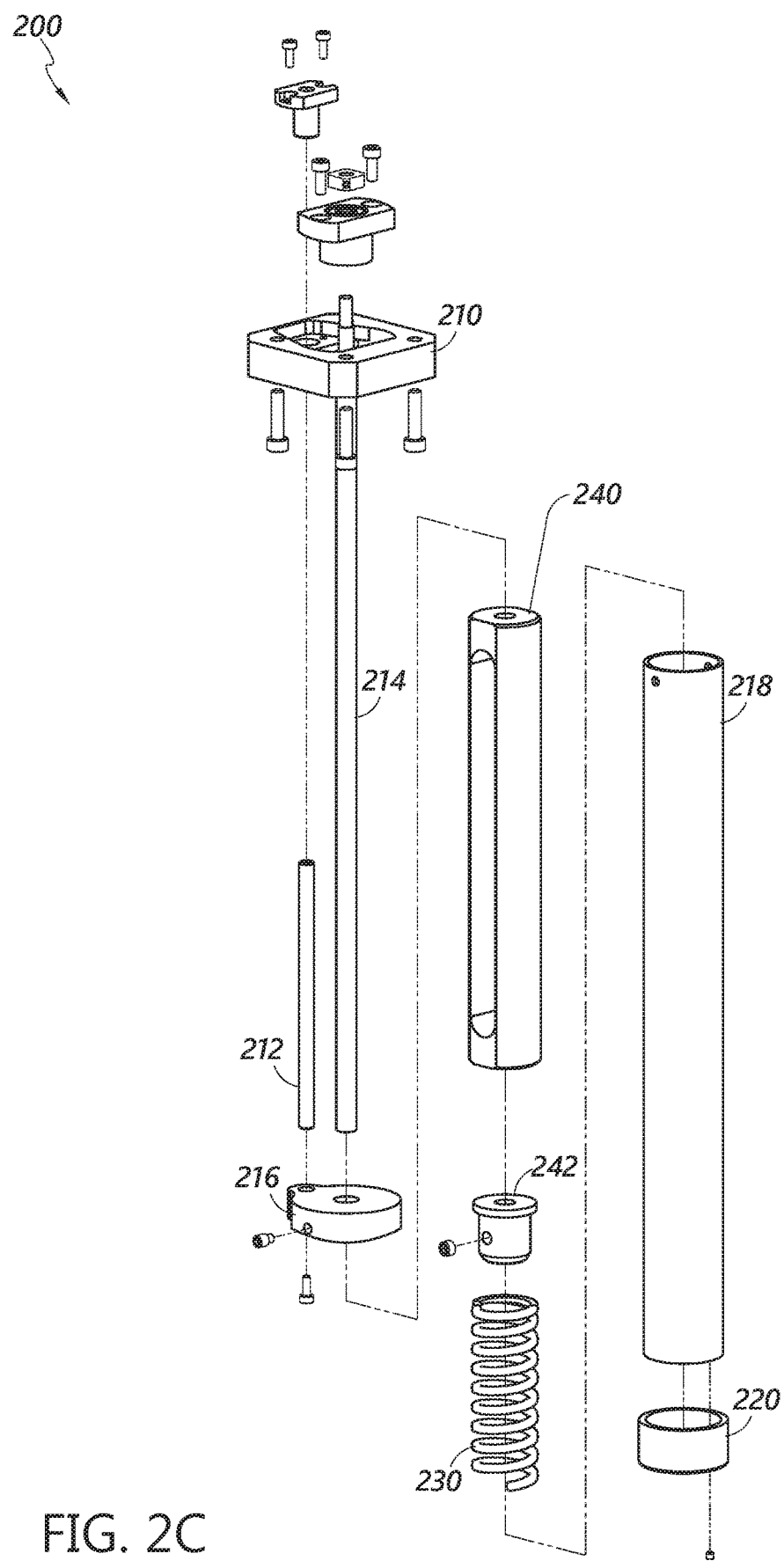
FIG. 2C is a diagram showing an exploded view of an illustrative entanglement end effector.

FIG. 2C is a diagram showing an exploded view of an illustrative entanglement end effector in an exploded view. The exploded view of the entanglement end effector 200 illustrates how elements may be assembled to provide the extendable/retractable entanglement features discussed. The anti-rotation guide 212 is shown as being secured to the sheath mounting assembly 216. The rotation shaft 214 extends through the sheath mounting assembly 216 through a bushing 240. The bushing 240 may be positioned to keep the sheath 218 concentric to the sheath mounting assembly 216 by providing linear and rotational guidance.

The rotation shaft 214 may couple with an entanglement mount 242. The bushing 240 rests upon or near the entanglement mount 242. In some implementations, the bushing 240 may be formed, at least in part, by a compressible material to apply a downward force on the entanglement mount 242. In some implementations, a compression element such as a spring may be disposed between the bushing 240 and the entanglement mount 242 to provide a similar downward force.

The rotation shaft 214 and anti-rotation guide 212 are shown as being secured using pins or screws. In some implementations, one or both of these elements may be secured using adhesive or other permanent or replaceable fastening elements. In an embodiment where a sensor is included on the entanglement structure 230, a slip ring may be included in the entanglement mount 242. The slip ring may provide a path for power or data connections to pass from the entanglement structure 230 to a controlling element included in the entanglement end effector 200 or the grasping mount 150 including the entanglement end effector 200.

Figure 2D:
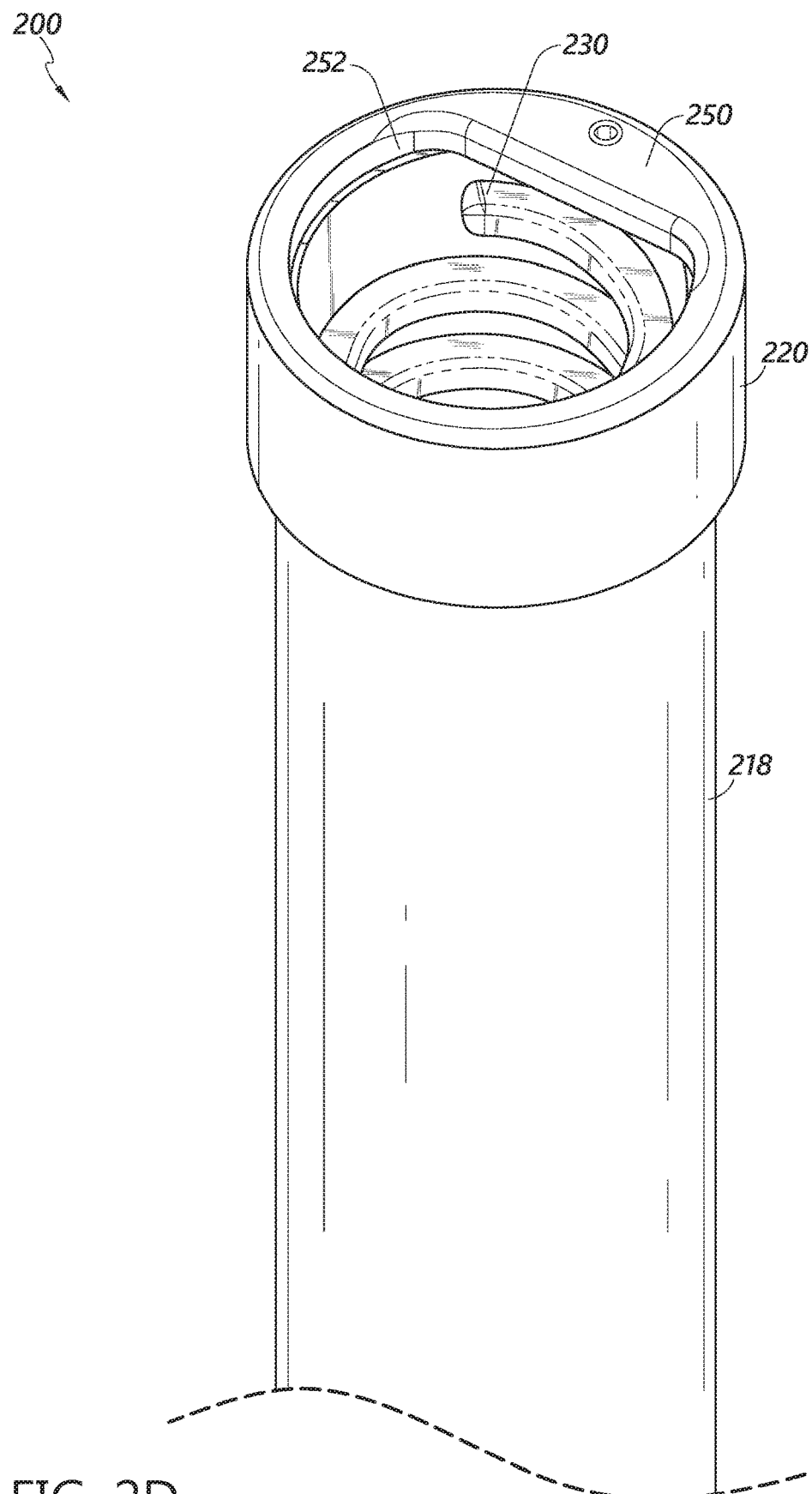
FIG. 2D is a diagram showing bottom view of an illustrative entanglement end effector.

FIG. 2D is a diagram showing bottom view of an illustrative entanglement end effector. The entanglement structure 230 is shown in the retracted state. A downward force from the bushing 240 or other compression element within the sheath 218 may cause the entanglement structure 230 to press against a retainer 250. When rotated, the entanglement structure 230 may extend from an egress edge 252 of the retainer 250. The retainer 250 forms a retaining portion to reduce a diameter of an orifice through which the entanglement structure 230 extends from the sheath 218.

Figure 3:
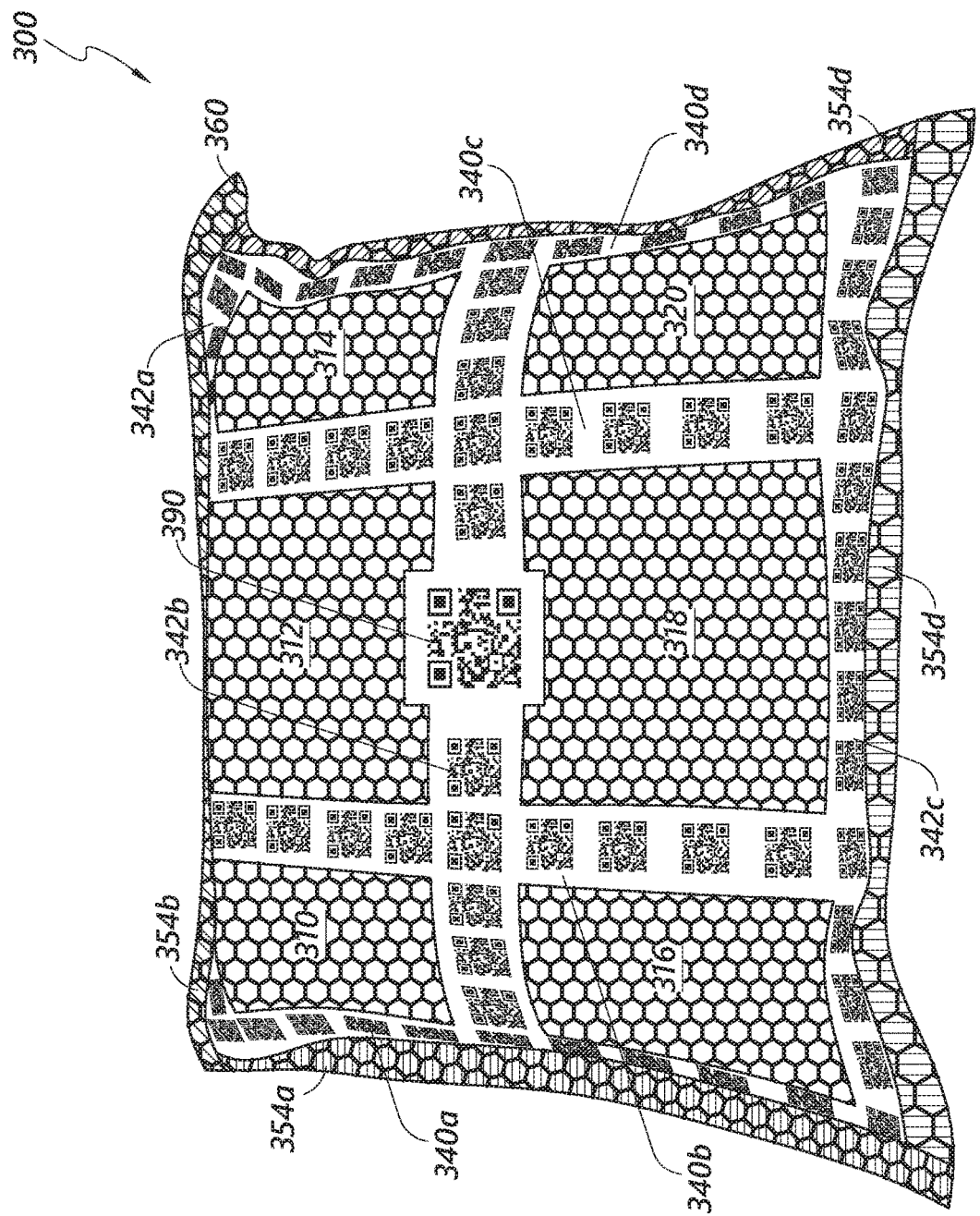
FIG. 3 is a diagram showing an example overpackage that may be discovered and moved by an entanglement end effector.

FIG. 3 is a diagram showing an example overpackage that may be discovered and moved by an entanglement end effector. The overpackage 300 shows six pick zones—zone 310, zone 312, zone 314, zone 316, zone 318, and zone 320. The pick zones may be defined by the arrangement of identifier strips affixed or integrated into the mesh of the overpackage 300. In some embodiments, the mesh may be scrim or other material arranged in a woven pattern with spacing between the fibers or filaments of the material to entangle with the entanglement end effector 200. Four identifier strips (e.g., identifier strip 340a, identifier strip 340b, identifier strip 340c, and identifier strip 340d) are arranged parallel to a first edge of the overpackage 300. Three identifier strips (e.g., identifier strip 342a, identifier strip 342b, and identifier strip 342c) are arrange in parallel to a second edge of the overpackage 300. The second edge may be perpendicular to the first edge.

An identifier strip may include one or more scannable identifiers. A scannable identifier may be included to self-identify the overpackage 300 as well as provide information about the scannable identifier such as the scannable identifier's location on the overpackage 300, a type of scannable identifier, or size of the scannable identifier. The scannable identifiers (individually or as part of a strip) may be affixed, printed, integrally woven, or otherwise placed on or in an outer surface of the overpackage 300 such the scannable identifiers may be detected by the sensor 156. The type of scannable identifier may help guide a robotic actor to an entanglement zone which may serve as a coupling point for the entanglement end effector 200 to the overpackage 300. Identifier types that may be included on the overpackage 300 include location identifiers, entanglement zone identifiers, or stowage point identifiers. For a given identifier type, additional parameters may be encoded to further specify a property of the scannable identifier or the overpackage 300. For example, if the identifier type indicates that the scannable identifier is an entanglement zone identifier, an entanglement structure type suited for the mesh within the entanglement zone may be specified.

A zipper or other sealing structure 360 may be included on the overpackage 300. The sealing structure 360 may be released to open the area within the overpackage 300 to receive an object. To help ensure the object remains within the overpackage 300, the sealing structure 360 may be secured.

Colors or patterns may also be used to orient the entanglement end effector relative to the overpackage 300. For example, orientation identifiers 354a, 354b, 354c, and 354d may be included on the overpackage 300. Each orientation identifier may be associated with a specific color or pattern that is, in turn, associated with a position of the overpackage 300. For example, the orientation identifier 354c may be the orientation identifier located at an edge of the overpackage 300 nearest to the sealing structure 360. Using compass directions for ease of explanation, orientation identifier 254c may point to north while the remaining orientation identifiers provide the remaining cardinal directions (east corresponding to 254d, west corresponding to 254b, and south corresponding to 254a). In some implementations, the overpackage 300 or portion thereof (e.g., the mesh) may be color coded or patterned to provide information about the overpackage 300, its geometry, or its construction.

In some implementations, an identifier may indicate the unique identifier for the overpackage 300, a node identifier indicating for the overpackage 300 what the specific node is (e.g., orientation identifier, scannable identifier, zone identifier), and the size of the node. Using the unique identifier for the overpackage 300, an overpackage model may be obtained. The overpackage model provides a geometric model of the overpackage and structures included therein (e.g., the identifier strips, entanglement zones, etc.). The node identifier allows selection of a specific point within the geometric model. For example, if a camera detects a scannable identifier 390, the robotic retrieval system 100 may determine that the scannable identifier 390 is located at the center of a first surface of the overpackage 300. This allows the robotic retrieval system 100 to orient the entanglement end effector 200 and generate an estimated location of an entanglement zone (e.g., zone 312 or zone 318). For example, a distance from the scannable identifier 390 to the zone 312 may be calculated using the overpackage model. The distance provides a general vicinity in which the zone 312 may be located.

The mesh of the overpackage 300 may be formed of nylon, canvas, or other fabric that can support the load expected for objects stored with the overpackage 300. In some embodiments, the mesh may be formed of a polymer or other plastic filament. Multiple bag sizes may be used to accommodate objects having different physical characteristics (e.g., shape, weight, packaging, etc.).

The embodiment shown in FIG. 3 shows one side of the overpackage 300. In the chaos of a fulfillment center, not every overpackage may consistently present a single surface. In some implementations, the overpackage 300 may include additional identifiers or identifier strips on other surfaces. As one example, the overpackage 300 may include additional identifier strips on the side of the overpackage 300 not visible in FIG. 3. As another example, if the overpackage 300 is a cube or rectangle, identifiers or identifier strips may be applied on all six surfaces of the overpackage 300.

The embodiment shown in FIG. 3 generally illustrates a reusable overpackage that can be sealed and resealed between uses. In some implementations, the sealing structure 360 of the overpackage 300 may be a one-time seal. For example, a manufacturer of the object may provide the object within a heat sealed overpackage. In this instance, the overpackage may be recycled or discarded once the object is retrieved. In some implementations, the one-time use overpackage may be used as the packaging to ship the object to a recipient.

Figure 4:
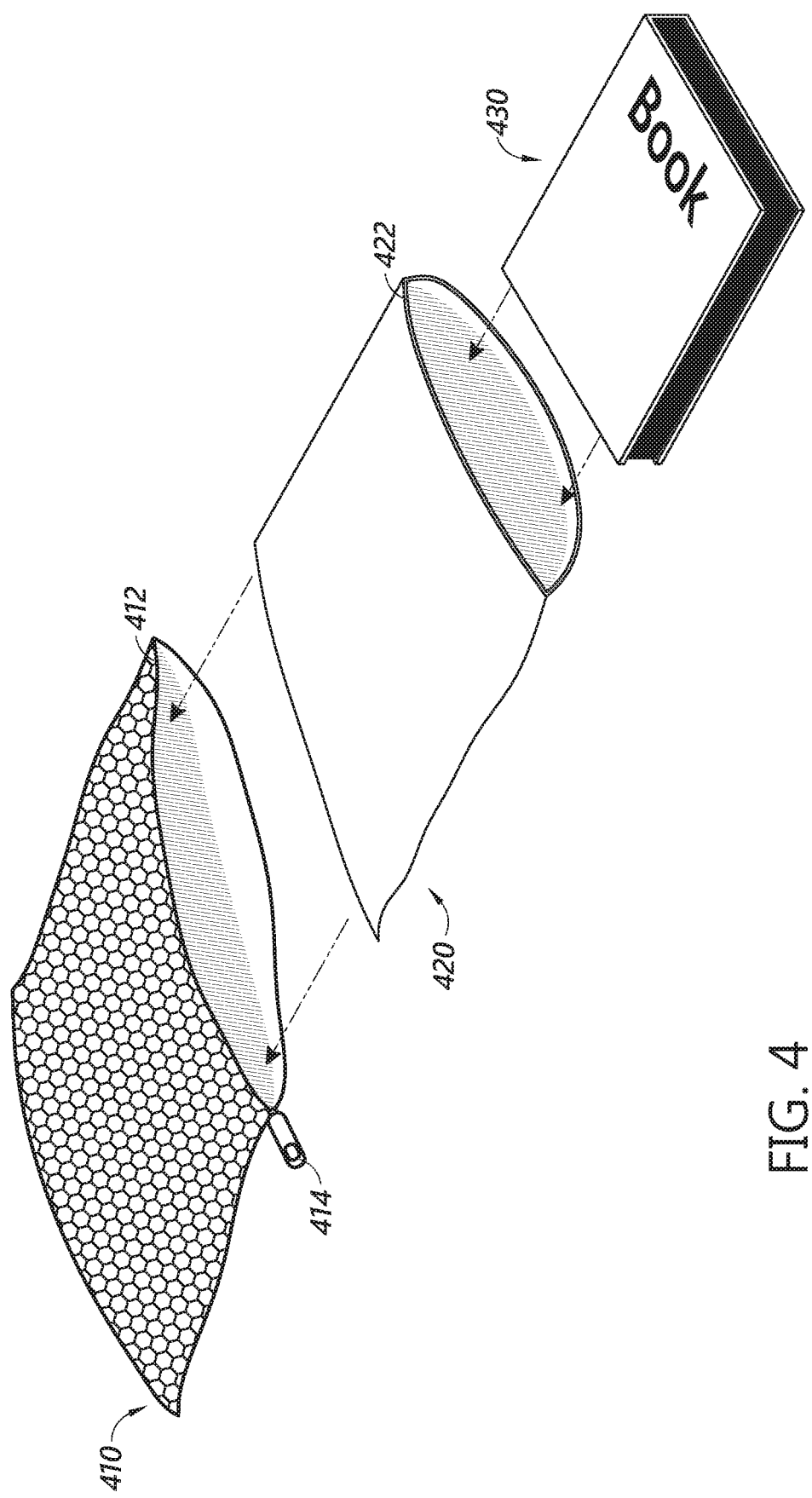
FIG. 4 is a diagram showing an exploded view of an example overpackage that may be discovered and moved by an entanglement end effector.

FIG. 4 is a diagram showing an exploded view of an example overpackage that may be discovered and moved by an entanglement end effector. The overpackage shown in FIG. 4 includes a mesh 412 that can receive an envelope 420 that forms an inner recess to contain at least one object 430. An outer edge 422 of the envelope 422 may be affixed within the mesh 412 such via stitching, cable ties, adhesive, or other connective structure or material. The mesh 412 may include a sealing structure 414 that, when closed, prohibits entry into the inner recess, thereby protecting the object 430. In some implementations, the sealing structure 414 may be integral to the envelope 422 rather than the mesh 412. The sealing structure may include a zipper, connective fabric (e.g., VELCRO™), adhesive, temperature bonded surfaces, or the like.

In some implementations, the envelope 420 may be color coded to provide additional information about the object 430, handling of the object 430, or entanglement information for the overpackage. The envelope 420 may be opaque to prevent any markings or identifiers on the object 430 from confusing the robotic retrieval system. The opacity may be desirable for one-time use overpackaging that will be used to ship an item. The opacity may provide privacy for the recipient such as when receiving potentially embarrassing or sensitive objects. When the overpackage is opaque, it may be desirable to provide a small window on an edge of the overpackage to allow visual inspection of the contents (e.g., the object 430).

In some implementations, the envelope 420 may be omitted. In such implementations, the mesh 412 may be applied to the object 430. The mesh 412 may be dispensed as using a tube whereby the object 430 is placed into the tube to be enveloped by the mesh 412. Once the object 430 is enveloped, the mesh 412 may be heat sealed. The heat seal encloses the object 430 and also seals an edge of the mesh material for another object.

Figure 5:
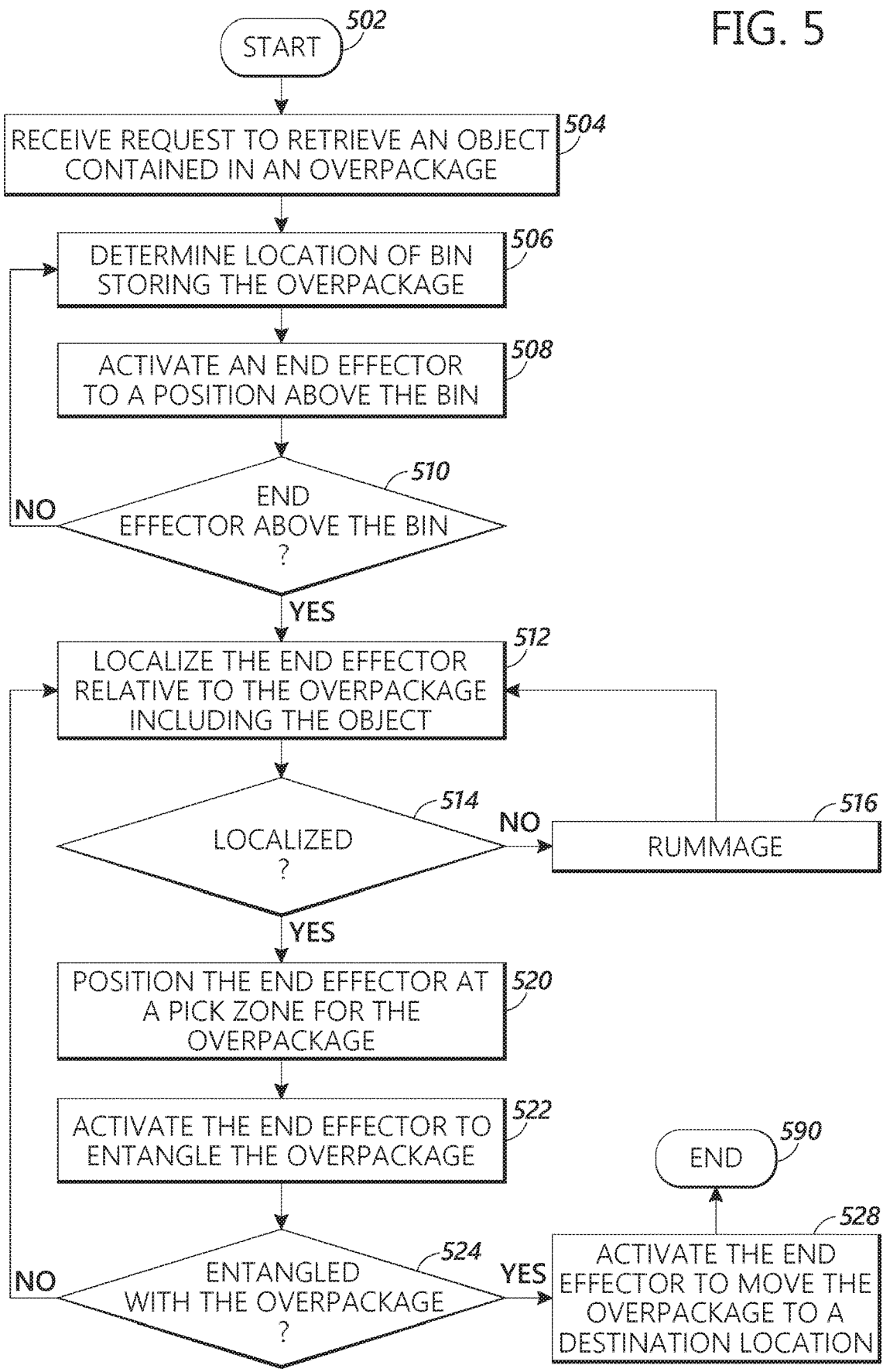
FIG. 5 is a flow diagram depicting an example method of retrieving an object enclosed in an overpackage with an entanglement end effector.

FIG. 5 is a flow diagram depicting an example method of retrieving an object enclosed in an overpackage with an entanglement end effector. The method 500 may be implemented in whole or in part by the devices described such as the robotic retrieval system. The method 500 shows how an end effector may be controlled to provide efficient and accurate retrieval of an object enclosed in an overpackage.

The method 500 begins at block 502. At block 504, the robotic retrieval system may receive a request to retrieve an object. The request may identify the object using a unique object identifier. The request may include a destination location indicating where the object should be placed once retrieved. The request may be received from an automated fulfillment system in response to an order for the object. For example, an online catalog system may present objects currently in inventory and facilitate transaction to request the object for delivery. The request may identify a specific instance of an object such as a specific copy of a book within the system. The request for the object may be converted to a request for the overpackage including the object. As the object is handled by the robotic retrieval system, the operational characteristics of the system may be logged in relation to the object. For example, the force or speed used to entangle or move the object once entangled may be recorded. The records of such operational characteristics may be used to assess reports of damaged objects. For example, if several reports are received from recipients of a specific type of object such as a compact disc, that the compact disc was damaged upon arrival. The robotic retrieval system may adjust the force or speed for handling future instances of similar objects. In this way, the robotic retrieval system may "learn" appropriate handling parameters for different objects over time.

At block 506, the robotic retrieval system may determine a location of the object. The object may be stowed in a bin within the fulfillment system. When the object was received at the fulfillment system, the object may be placed in an overpackage such as the overpackage 300. The object and the overpackage 300 may be scanned to create a record relating the object and the overpackage 300. The overpackage 300 may then be stored in a bin which may be placed on a rack within the fulfillment system. As the overpackage 300 is moved, a record of its location may be updated. The determination at block 506 may include determining the location of the overpackage 300 within the fulfillment system. The location may be specified using an identifier for a bin in which the overpackage 300 was placed or a rack on which the bin is stored.

In some implementations, at the time of the request, the bin including the overpackage 300 may not be accessible by an end effector. In such implementations, the robotic retrieval system may transmit a command to a mobile drive unit or other autonomous actor at the fulfillment center to retrieve the bin and place the bin into an area accessible by a gantry such as that shown in FIG. 1.

Once the bin storing the overpackage including the object is within an area associated with an end effector, at block 508, the entanglement end effector 200 may be activated to a position above the bin reported to include the overpackage 300. Activating the entanglement end effector 200 may include driving one or more motors or other devices to position the entanglement end effector 200. The entanglement end effector 200 may periodically collect sensor data such as by capturing images or transmitting a wireless signal such as an RFID interrogation signal. The activation may be based on the sensor data. For example, if an image is captured beneath the entanglement end effector 200, the image may be analyzed to determine whether an identifier associated with the overpackage 300 is shown in the image. The identifier may be a QR code, AprilTag, barcode, or other machine detectable identifier encoding information to uniquely identify the overpackage 300 or its location.

At block 510, the robotic retrieval system may determine whether the entanglement end effector 200 is above the bin including the overpackage 300. The determination may be based on data collected by the sensor 156 coupled to the entanglement end effector 200. The determination may be based on sensor data collected by another element of the robotic retrieval system. For example, the gantry may include one or more cameras for sensing the location of the entanglement end effector 200 and objects within the area under the gantry. A camera may include depth sensors to allow relative measures of location along three dimensions to be generated for objects in the area under the gantry. As another example, the motor 154 or the rail motor 114 may identify their location. The location may be identified in absolute terms or relative to a location within the fulfillment center such as the gantry or the area 110. The location of the motor 154 or the rail motor 114 may be used to determine the location of the entanglement end effector 200. In some implementations, two or more elements may provide location information. The provided locations may be compared to identify or triangulate the location of the entanglement end effector 200.

If the determination is at block 510 is negative, the method 500 may return to block 506 as described above. If the determination at block 510 is affirmative, at block 512, the robotic retrieval system may localize the entanglement end effector 200 relative to the overpackage 300 including the object. The localization may include determining a location of the overpackage 300 within the bin. The localization may include collecting information with one or more sensors and analyzing the collected information as described.

At block 514, the robotic retrieval system may determine whether the entanglement end effector 200 was able to be localized relative to the overpackage 300. The determination may include one or more of: identifying the overpackage 300 within the bin, identifying a specific orientation of the overpackage 300, and identifying a specific element of the overpackage 300 such as the zone 318. The identification may be based on identifiers associated with the overpackage 300.

If the determination at block 514 is negative, at block 516, the robotic retrieval system may initiate a rummaging procedure. The rummaging procedure may include activating an entanglement end effector to move one or more overpackages at or near a location of the desired overpackage. For example, the overpackage 300 may be stowed in a tote with several other overpackages. The other overpackages within the tote may block the sensor from detecting the first identifier of the desired overpackage. In such instances, moving the other overpackages may expose the overpackage 300 of interest. In some implementations, rummaging may include activating other autonomous actors within the fulfillment center. For example, if the tote is retrieved from a location using a mobile drive unit, a command message may be provided to cause the mobile drive unit to shake the tote such as by moving forward and backward or tilting the tote. Once the rummaging is completed, the method 500 may return to block 512 as described.

Returning to block 514, if the entanglement end effector 200 is localized vis-à-vis the overpackage 300, at block 520, the robotic retrieval system may position the entanglement end effector 200 at a zone (e.g., the zone 318) of the overpackage 300. The positioning at block 520 may include activating the rail motor 114, the motor 154, or an elevation mechanism associated with the entanglement end effector 200. The positioning may move the entanglement end effector 200 to be within a specific distance from a target entanglement zone (e.g., the zone 318) such that entanglement end effector 200 may be activated to engage the entanglement structure 230 with the mesh of the overpackage 300 at or near the target entanglement zone. For example, the entanglement end effector 200 may be adjusted to one millimeter above the target entanglement zone.

At block 522, the robotic retrieval system may activate the entanglement end effector 200. The activation may include extending and rotating the entanglement structure 230 to engage with the mesh of the target zone of the overpackage 300.

At block 524, a determination is made as to whether the entanglement end effector 200 is engaged with the overpackage 300. The determination may be based on a sensor included in the entanglement structure 230. For example, the entanglement structure 230 may resonate a frequency or emit other detectable properties that can change as the mesh of the overpackage moves along the coil of the entanglement structure 230. The sensor may be configured to compare the detected property with a threshold value that corresponds to successful entanglement. In some implementations, a load sensor may be included to detect to the entanglement end effector 200. The detected load information may be compared to a threshold load and, if the detected load corresponds to the threshold load, engagement with the overpackage 300 is deemed to have occurred. The threshold load may be identified based on an item identifier associated with the overpackage 300. For example, if the item identifier is associated with a book, the weight of the book may be identified from a catalog system using the item identifier.

If the determination at block 524 is negative, the method 500 may proceed to block 512 to localize and reposition the entanglement end effector 200 as described above. The repositioning of the entanglement end effector 200 may include collecting additional sensor data regarding the position of the entanglement end effector 200 or the overpackage 300. In some implementations, the overpackage 300 may be hidden from view such as under other overpackages. In such instance, repositioning the entanglement end effector 200 may include engaging with a pick point of another overpackage and moving the other overpackage to another position within the container. Repositioning may include activating one or more motors to change the position of the entanglement end effector 200.

If the determination at block 524 is affirmative, the method 500 may proceed to block 528. At block 428, the entanglement end effector 200 may be activated to move the overpackage 300 and the object enclosed therein to a destination location. In some implementations, the destination location may be a bin or other conveyor near the gantry. The bin or other conveyor may move the overpackage 300 toward the ultimate destination. The method 500 ends at block 590.

Although the features discussed generally relate to a warehouse storing objects to fulfill orders, the robotic retrieval features may be implemented in other environments. For example, the gantry may be included to cover a bed of a delivery truck. Objects may be loaded onto the truck and as a delivery route is traversed, the end effector 200 may be activated to retrieve objects for an upcoming location on the delivery route. As objects are retrieved, they may be presented to an accessible location on the truck such as to the cab of the truck or an access port into the bed. A delivery agent may thus retrieve the object from the accessible location for final delivery.

Although the features discussed generally relate to retrieving objects, the same features may be used for receiving objects at a fulfillment center. In such implementations, an object is associated with an overpackage and placed at an ingestion point. A command to retrieve the object and move it to a container may be processed using a method such as the method 500 shown in FIG. 5.

Figure 6:
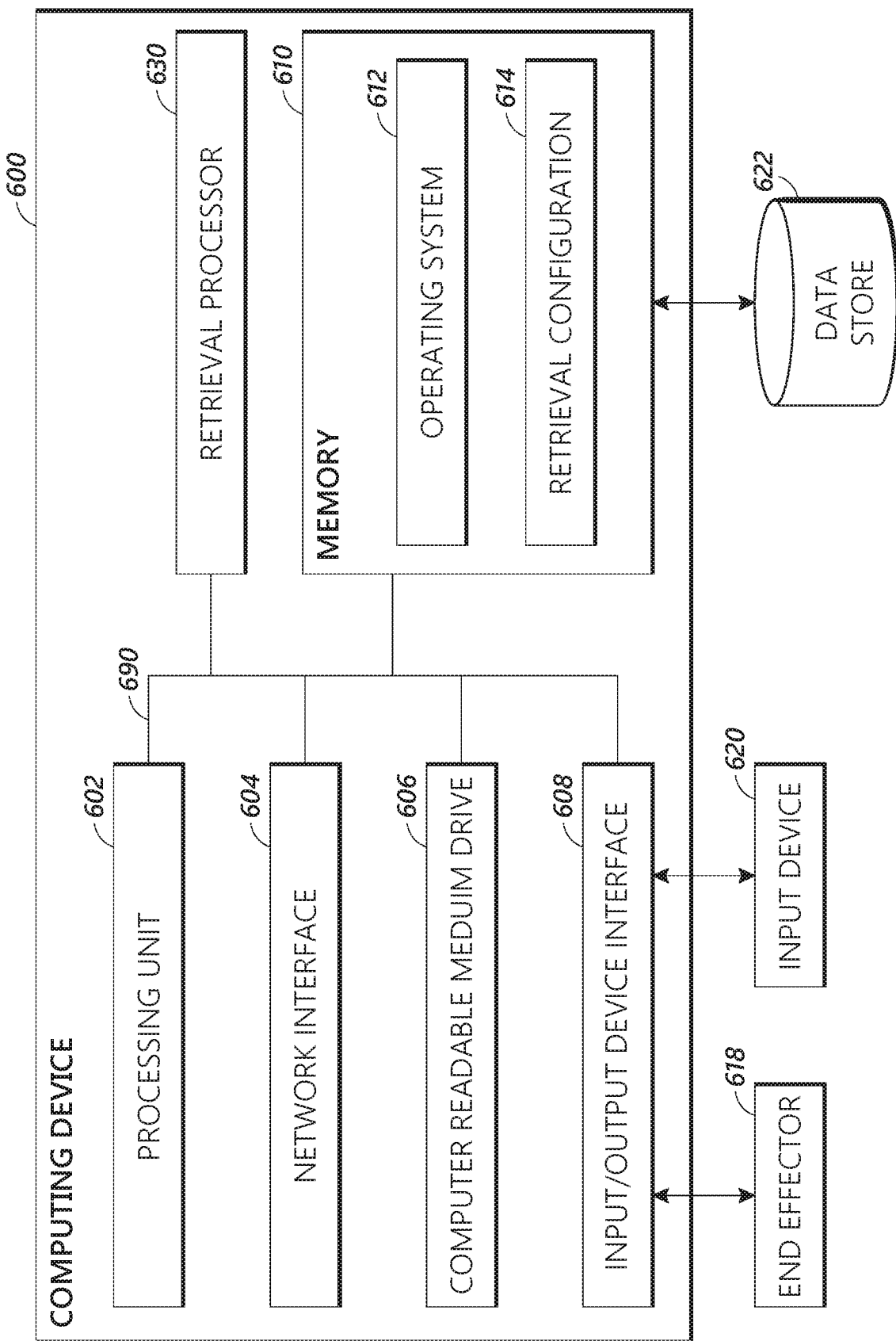
FIG. 6 is a block diagram of an illustrative computing device that may implement one or more of the overpackage based retrieval features described.

FIG. 6 is a block diagram of an illustrative computing device that may implement one or more of the overpackage based retrieval features described. The computing device 600 may implement the method shown in of FIG. 5. The computing device 600 can be a server, a communication device included in an end effector 618, or other computing device. The computing device 600 can comprise a processing unit 602, a retrieval processor 630, a network interface 604, a computer readable medium drive 606, an input/output device interface 608, and a memory 610. The network interface 604 can provide connectivity to one or more networks or computing systems. The processing unit 602 can receive information and instructions from other computing systems or services via the network interface 604. The network interface 604 can also store data directly to memory 610. The processing unit 602 can communicate to and from memory 610. The processing unit 602 may communicate with the end effector 618 via the input/output device interface 608. The input/output device interface 608 can also accept input from the input/output device 620, such as a keyboard, mouse, digital pen, microphone, mass storage device or sensing devices used for robotic retrieval such as an optical sensor, a magnetic sensor, a wireless signal detector, a global positioning service device, etc.

The memory 610 contains computer program instructions that the processing unit 602 executes in order to implement one or more embodiments. The memory 610 may include RAM, ROM, and/or other persistent, non-transitory computer readable media. The memory 610 can store an operating system 612 that provides computer program instructions for use by the processing unit 602 or other elements included in the computing device in the general administration and operation of the computing device 600. The memory 610 can further include computer program instructions and other information for implementing aspects of the present disclosure.

For example, in one embodiment, the memory 610 includes a retrieval configuration 614. The retrieval configuration 614 may include the thresholds, tolerances, authentication information (e.g., encryption keys, tokens, device identifiers, etc.), end effector capability information, or other predetermined or configurable values described herein. The retrieval configuration 614 may store specific values for a given configuration. The retrieval configuration 614 may, in some implementations, store information for obtaining values for a given configuration element. For example, a registry of overpackaging models may be specified as a network location (e.g., URL) in conjunction with username and password information to access the network location to obtain or verify information associated with a an overpackage or property thereof (e.g., capabilities, dimensions, overpackaging mode, current location, etc.). The retrieval configuration 614 may be used by the retrieval processor 630 to implement one or more of the aspects described herein. In some implementations, the retrieval processor 630 may include specific computer executable instructions that cause the computing device 600 to perform one or more of the robotic retrieval features described.

The memory 610 may also include or communicate with one or more auxiliary data stores, such as data store 622. The data store 622 may electronically store data regarding the object, the overpackage, geometry models for overpackages, etc.

The elements included in the computing device 600 may be coupled by a bus 690. The bus 690 may be a data bus, communication bus, or other bus mechanism to enable the various components of the computing device 600 to exchange information.

In some embodiments, the computing device 600 may include additional or fewer components than are shown in FIG. 6. For example, a computing device 600 may include more than one processing unit 602 and computer readable medium drive 606. In another example, the computing device 600 may not be coupled to the end effector 618 or the input device 620. In some embodiments, two or more computing devices 600 may together form a computer system for executing features of the present disclosure.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

In an embodiment of the robotic retrieval system, the retrieval may be described as a workflow. The first step in the process may be pairing the incoming objects with an overpackage and a tote. Once entry scan is completed the objects may be stored in a warehouse or other storage facility until they are requested and retrieved by robotic drive units. Totes then enter the order fulfillment system envelope where they may be activated from a low power state and prepared for request. The system may then move the gantry head over the tote and the system communicates with the overpackages to request a certain object. The overpackage may be recognized and localized by a computer vision system receiving image data from a sensor on the end effector or mounted to the gantry. Once a suitable entanglement zone is selected, the entanglement end effector may position itself to interact with the zone. Once entangled, the overpackage including the desired object may then be removed from the tote and placed in at a destination location such as a corresponding order tote. If the overpackage is not identified or an entanglement zone is not recognized, the system may invoke an error handling mode (e.g., rummaging). Error handling may include entangling and moving another object from the tote into a buffer until the overpackage of interest become visible. The features increase the efficiency of this process by simplifying the grasping, identification, and localization.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as specialized hardware, or as specific software instructions executable by one or more hardware devices, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A delivery information device (e.g. delivery information system) can be or include a microprocessor, but in the alternative, the delivery information device can be or include a controller, microcontroller, or state machine, combinations of the same, or the like configured to efficiently process and present event data for delivery of an object. A delivery information device can include electrical circuitry configured to process computer-executable instructions. Although described herein primarily with respect to digital technology, a delivery information device may also include primarily analog components. For example, some or all of the filtering algorithms or interfaces described herein may be implemented in analog circuitry or mixed analog and digital circuitry. A computing environment can include a specialized computer system based on a microprocessor, a mainframe computer, a digital signal processor, a portable computing device, a device controller, or a computational engine within an appliance, to name a few.

The elements of a method, process, routine, interface, or algorithm described in connection with the embodiments disclosed herein can be embodied directly in specifically tailored hardware, in a specialized software module executed by a delivery information device, or in a combination of the two. A software module can reside in random access memory (RAM) memory, flash memory, read only memory (ROM), erasable programmable read-only memory (EPROM), electrically erasable programmable read-only memory (EEPROM), registers, hard disk, a removable disk, a compact disc read-only memory (CD-ROM), or other form of a non-transitory computer-readable storage medium. An illustrative storage medium can be coupled to the delivery information device such that the delivery information device can read information from, and write information to, the storage medium. In the alternative, the storage medium can be integral to the delivery information device. The delivery information device and the storage medium can reside in an application specific integrated circuit (ASIC). The ASIC can reside in an access device or other delivery information device. In the alternative, the delivery information device and the storage medium can reside as discrete components in a filtering device or electronic communication device. In some implementations, the method may be a computer-implemented method performed under the control of a computing device, such as an access device or electronic communication device, executing specific computer-executable instructions.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each is present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

As used herein, the terms "determine" or "determining" encompass a wide variety of actions. For example, "determining" may include calculating, computing, processing, deriving, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing, and the like.

As used herein, the term "selectively" or "selective" may encompass a wide variety of actions. For example, a "selective" process may include determining one option from multiple options. A "selective" process may include one or more of: dynamically determined inputs, preconfigured inputs, or user-initiated inputs for making the determination. In some implementations, an n-input switch may be included to provide selective functionality where n is the number of inputs used to make the selection.

As used herein, the terms "provide" or "providing" encompass a wide variety of actions. For example, "providing" may include storing a value in a location for subsequent retrieval, transmitting a value directly to the recipient, transmitting or storing a reference to a value, and the like. "Providing" may also include encoding, decoding, encrypting, decrypting, validating, verifying, and the like.

As used herein, the term "message" encompasses a wide variety of formats for communicating (e.g., transmitting or receiving) information. A message may include a machine readable aggregation of information such as an XML document, fixed field message, comma separated message, or the like. A message may, in some implementations, include a signal utilized to transmit one or more representations of the information. While recited in the singular, it will be understood that a message may be composed, transmitted, stored, received, etc. in multiple parts.

The foregoing description and claims may refer to elements or features as being "connected" or "coupled" together. As used herein, unless expressly stated otherwise, "connected" means that one element/feature is directly or indirectly connected to another element/feature, and not necessarily mechanically. Likewise, unless expressly stated otherwise, "coupled" means that one element/feature is directly or indirectly coupled to another element/feature, and not necessarily mechanically.

Thus, although the various schematics shown in the Figures depict example arrangements of elements and components, additional intervening elements, devices, features, or components may be present in an actual embodiment (assuming that the functionality of the depicted circuits is not adversely affected). While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes that come within the meaning and range of equivalency of the claims are to be embraced within their scope.

What is claimed is:

1. A robotic retrieval system comprising:
an end effector including:
a sheath;
an entanglement coil; and
a rotation shaft coupled with the entanglement coil, wherein the rotation shaft rotates the entanglement coil in at least two directions, wherein rotation in a first direction causes the entanglement coil to extend from the sheath and to entangle with a mesh overpackage, and wherein rotation in a second direction causes the entanglement coil to retract into the sheath and to disentangle from the mesh overpackage; and
a motor configured to position the end effector within an area including the mesh overpackage.

2. The robotic retrieval system of claim 1, wherein
the end effector further includes a load sensor coupled with the entanglement coil, and
the robotic retrieval system further includes a processor communicatively coupled with the load sensor and configured to at least:
receive load information from the load sensor; and
determine that the mesh overpackage is entangled with the entanglement coil based at least in part on the load information received from the load sensor.

3. The robotic retrieval system of claim 1, wherein the end effector further includes a collar through which the entanglement coil extends, wherein the collar includes a retaining portion that reduces a diameter of an orifice through which the entanglement coil extends from the sheath.

4. An end effector configured to entangle an object, the end effector comprising:
a sheath;
an entanglement thread;
a shaft coupled with the entanglement thread, wherein the shaft moves the entanglement thread in at least two directions, wherein moving the shaft in a first direction causes the entanglement coil to extend from the sheath and to entangle a portion of the object, and wherein moving the shaft in a second direction causes the entanglement coil to disentangle from the portion of the object and retract into the sheath.

5. The end effector of claim 4, further comprising a pneumatic actuator coupled with the shaft configured to actuate moving the shaft between the first and second directions.

6. The end effector of claim 4, wherein at least a portion of the entanglement thread forms a coil.

7. The end effector of claim 6, wherein at least a portion of the entanglement thread is comprised of a metal.

8. The end effector of claim 4, further comprising a load sensor coupled with the entanglement thread, wherein the load sensor is communicatively coupled with a processor configured to at least:
receive load information from the load sensor; and
determine that the object is entangled with the entanglement thread based at least in part on the load information received from the load sensor.

9. The end effector of claim 8, wherein the load sensor is disposed on a leading tip of the entanglement thread, wherein the leading tip is a portion of the entanglement thread that entangles with the object before another portion of the entanglement thread.

10. The end effector of claim 4, wherein the shaft moves the entanglement thread clockwise and counterclockwise.

11. The end effector of claim 4, further comprising a collar through which the entanglement thread extends, wherein the collar includes a retaining portion that reduces a diameter of an orifice through which the entanglement coil extends from the sheath.

12. A computer-implemented method of robotic object retrieval, the computer-implemented method comprising:
under control of one or more processing devices:
receiving a request for an object;
determining a location for a bin where the object is stored;
activating an end effector to move to a position relative to the bin based at least in part on the location;
determining that the end effector is located relative to the bin;
causing at least a portion of the end effector to entangle with an overpackage within the bin, wherein the overpackage contains the object;
detecting entanglement of the overpackage with the end effector; and
in response to detecting the entanglement,
activating the end effector to move the overpackage containing the object to a destination location, and further activating the end effector to disentangle from the overpackage.

13. The computer-implemented method of claim 12, further comprising:
receiving sensor data indicating a distance between the end effector and the overpackage,
wherein causing the at least a portion of the end effector to entangle with the overpackage is based at least in part on determining that the distance corresponds to an entanglement threshold.

14. The computer-implemented method of claim 12, wherein:
the end effector includes a sheath, an entanglement thread, and a shaft coupled with the entanglement thread,
causing the at least a portion of the end effector to entangle with the overpackage comprises:
causing the shaft to move the entanglement thread in at least one of two directions.

15. The computer-implemented method of claim 12, wherein:
the end effector includes a load sensor, and
the computer-implemented method further comprises detecting the entanglement of the overpackage based at least in part on the load information received from the load sensor.

16. The computer-implemented method claim 12 further comprising receiving, from an image sensor, an image of the end effector after entanglement, and wherein detecting the entanglement is based at least in part on identifying the object in the image and identifying the end effector in the image.

17. The computer-implemented method of claim 12, wherein activating the end effector comprises at least one of:
activating a motor to move the end effector to the position over the bin; and activating a winch to raise or lower at least a portion of the end effector.

18. The computer-implemented method of claim 12, wherein:
- the at least a portion of the end effector includes a coil, and
- causing the at least a portion of the end effector to entangle with the overpackage comprises causing the coil to engage a portion of at least one of the overpackage or the object.

19. The computer-implemented method of claim 12, further comprising:
- receiving an image of at least a portion of the bin;
- detecting a graphic code shown in the image, wherein the graphic code encodes: (a) an identifier associated with the object, (b) dimensions of the graphic code, and (c) a location of the graphic code on the overpackage; and
- determining a current location of the end effector based at least in part on the dimensions of the graphic code and location of the graphic code as compared to the graphic code as shown in the image.

20. The computer-implemented method of claim 12, wherein:
- the end effector includes at least two entanglement structures, and
- the computer-implemented method further comprises:
    - selecting at least one of the at least two entanglement structures to entangle with the overpackage, said selecting based at least in part on a physical characteristic of the object.

* * * * *